(No Model.)

G. H. BENNETT.
LATHE.

No. 449,065. Patented Mar. 24, 1891.

Attest:
Henry Appleton
Emma L. Kerr.

Inventor:
George H. Bennett
by R. H. Hoxie
Attorney

UNITED STATES PATENT OFFICE.

GEORGE H. BENNETT, OF CINCINNATI, OHIO, ASSIGNOR OF ONE-HALF TO FRANCIS M. DILLIE, OF SAME PLACE.

LATHE.

SPECIFICATION forming part of Letters Patent No. 449,065, dated March 24, 1891.

Application filed April 19, 1890. Serial No. 348,669. (No model.)

*To all whom it may concern:*

Be it known that I, GEORGE H. BENNETT, a citizen of the United States, residing at Cincinnati, Ohio, have invented new and useful Improvements in Lathes, of which the following is a specification.

My invention relates to turning-lathes, and particularly to the back-gear mechanism for changing the speed, its object being to improve the clutch mechanism and its combination with the back-gear, whereby the clutch may be automatically engaged and disengaged by the act of throwing the back gears out of or into engagement with the spindle-gears.

It also consists in the construction of the clutch, whereby its engagement is assured at any speed and in either direction.

Mechanism embodying my invention is exhibited in the accompanying drawings, in which—

Figure 1:
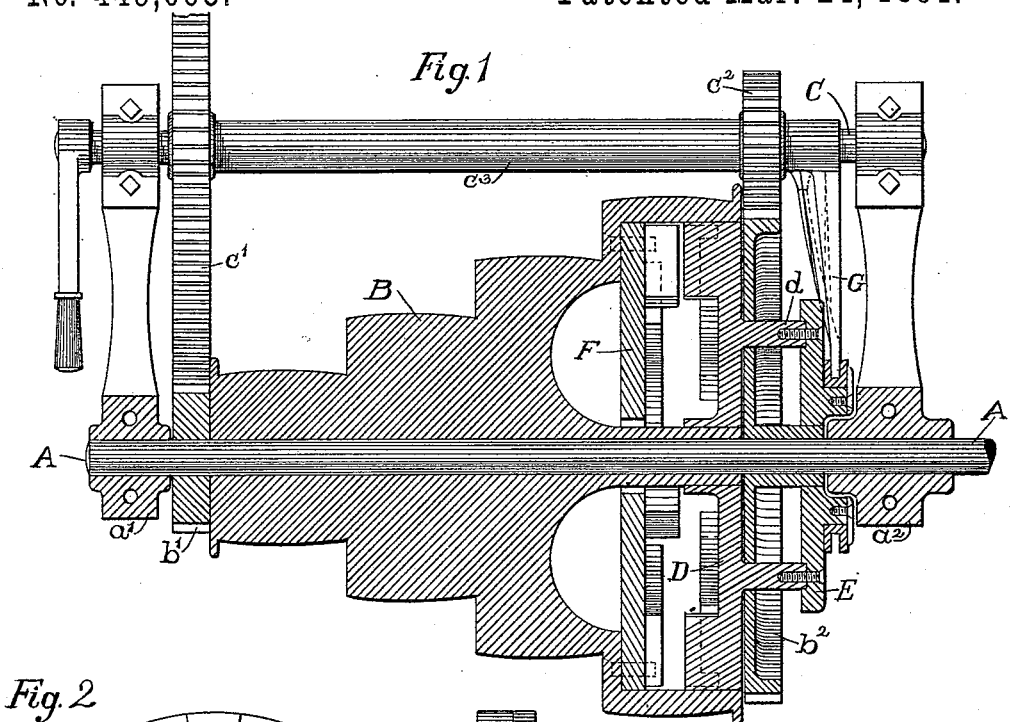
Figure 2:
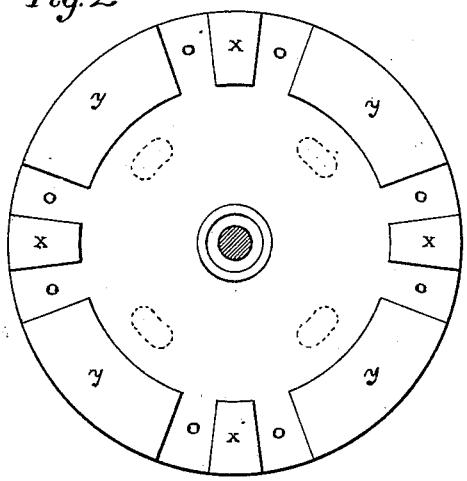
Figure 3:
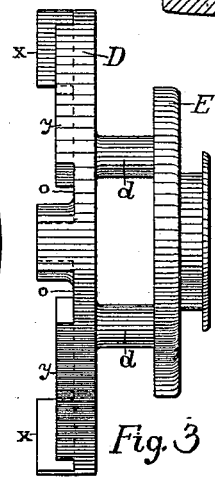
Figure 5:
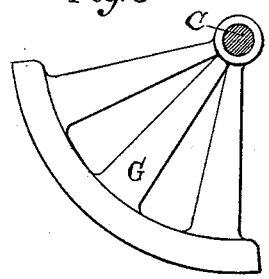
Figure 4:
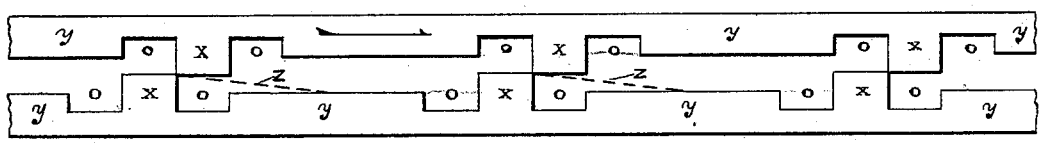

Figure 1 is a plan view of the lathe-spindle mechanism and its back gear, the cone-pulley, clutch, and operating-sheave being shown in axial section. Fig. 2 is a face view of the movable clutch member. Fig. 3 is a side view of the clutch and operating-sheave detached from the lathe. Fig. 4 is an isometric diagram of the clutch projections and recesses. Fig. 5 is a side view of the operating-cam upon the back-gear shaft.

Referring now to the drawings, A designates the lathe-spindle; $a'$ $a^2$, its bearings; B, the cone-pulley; $b'$, the spur-pinion upon the cone-pulley; $b^2$, the spur-gear upon the lathe-spindle; C, the back-gear shaft; $c'$ $c^2$, the spur-gears of the back-gear shaft; and $c^3$ the connecting-sleeve, all being constructed and arranged in the usual manner, excepting as herein specified.

At the rear of the spur-gear $b^2$ of the spindle A and within the hollow end of the cone-pulley B is placed a disk D, having two or more concentric arms or stems $d$ projecting through correspondingly-formed apertures in the spur-gear $b^2$ and carrying at the forward side of the spur-gear $b^2$ a grooved sheave E, sliding upon the projected hub of the gear $b^2$. The sheave E is socketed upon the stems $d$ and rigidly held thereto by countersunk screws threaded into the stems longitudinally, the stems being of sufficient length to allow proper side motion of the structure thus formed and shown in Fig. 3. The rear side of the disk D is formed into a series of projecting teeth and recesses arranged as shown in Fig. 2, and isometrically in Fig. 4—that is to say, two or more (four in the present case) teeth $x$ of maximum height, flanked at either side by corresponding recesses $o$ of maximum depth, and a long tooth or ledge $y$ of intermediate height intervening between each two recesses. A corresponding duplicate F of the disk D is attached to the interior face of the cone-pulley B, facing outwardly, so that when the clutch structure D E is shifted to the left hand the clutch-disk D engages with the clutch-disk F, thus bringing the cone-pulley B into rotative engagement with the structure D E.

The means for shifting the clutch structure D E will presently be described; but, as it is itself in constant rotative engagement with the spur-gear $b^2$ by the arrangement of the stems $d$ through the web of said spur-gear, it will be seen that the engagement or disengagement of the clutch-disks D F engages or disengages the cone-pulley B in relation to the spindle A.

The action of the engaging teeth of the clutch-disks will be understood from Fig. 4, in which we may suppose the upper member to be in motion in the direction indicated by the arrow and under lateral engaging pressure and the lower member to be at rest. The teeth $x$ of the upper member after passing the teeth $x$ of the lower member follow the dotted lines $z$, striking upon the intermediate ledges $y$ and passing on until they strike against the succeeding teeth $x$ of the lower member and then pass down into the recesses $o$, locking the parts firmly together in rotation. The relative arrangement of teeth and recesses being the same for either direction, the engaging action will be the same whatever the direction of rotation. The hub of the disk D is extended rearward to guide upon the hub of the cone-pulley B to insure the proper engagement of the clutch-disk teeth. The adjusting motion is given to the clutch structure D E by a cam-segment G, centered rigidly upon the back-gear shaft C and having its forward edge engaging in the groove of the sheave E. The act of throwing over the back gear to engage the gears of the spindle withdraws the clutch members from engagement, and vice versa, the lateral bend or inclination of the cam being arranged to engage or disengage the clutch-disks in proper relation to the engagement of the gears.

I claim as my invention and desire to secure by Letters Patent of the United States—

1. In a lathe, in combination with its back gear, a spindle, a loose driving-pulley thereon provided with a face having clutch recesses and projections, a laterally-adjustable clutch-disk having permanent rotative engagement with the spindle and a face with corresponding clutch recesses and projections, and means, substantially as set forth, for simultaneously shifting the back gear into and out of engagement with the spindle and the clutch-disk out of and into engagement with the driving-pulley, substantially as set forth.

2. In a lathe, in combination with its back-gear mechanism, a laterally-adjustable clutch-disk at the pulley side of the spindle-gear, a shifting-sheave at the outside of the spindle-gear, rigid concentric arms uniting the clutch disk and sheave through the spindle-gear, a corresponding clutch-disk at the inner face of the cone-pulley, and a cam upon the back-gear shaft, engaging the shifting-sheave to adjust the clutches into or out of engagement coincidently with the engagement or disengagement of the back gears with those of the spindle, substantially as set forth.

3. In combination with a lathe or other mechanism, a clutch device embodying the following construction, to wit: corresponding clutch-disks engaging by lateral adjustment upon the same shaft, each disk having a series of equidistant concentric teeth with recesses flanking the teeth at both sides and ledges of lesser height intervening between the recesses, substantially as set forth.

In testimony whereof I have hereunto set my hand in the presence of two subscribing witnesses.

GEORGE H. BENNETT.

Witnesses:
L. M. HOSEA,
HENRY APPLETON.